United States Patent [19]

Ohkuma et al.

[11] Patent Number: 4,714,397
[45] Date of Patent: Dec. 22, 1987

[54] AUTOMATIC PARTS FEEDER

[75] Inventors: Kuniaki Ohkuma; Reiji Nakagawa; Hisao Miyao, all of Saitama; Shinichi Yoshimura; Toshio Suzuki, both of Tokyo; Toyoaki Hayashi, Saitama; Masayasu Arakawa, Saitama; Hideharu Koizumi, Saitama, all of Japan

[73] Assignee: Honda Giken Kogyo Kabushiki Kaisha, Tokyo, Japan

[21] Appl. No.: 801,006

[22] Filed: Nov. 22, 1985

[30] Foreign Application Priority Data

| Nov. 22, 1984 [JP] | Japan | 59-247221 |
| Nov. 22, 1984 [JP] | Japan | 59-247222 |
| Nov. 22, 1984 [JP] | Japan | 59-247223 |
| Nov. 22, 1984 [JP] | Japan | 59-247224 |

[51] Int. Cl.$^4$ ............................................. B65H 1/00
[52] U.S. Cl. ................................. 414/222; 414/226; 198/468.2; 198/468.6; 198/468.11; 198/532; 209/910; 209/914; 209/916; 221/93; 221/131; 221/225
[58] Field of Search ............ 414/222, 224, 225, 226; 198/463.4, 468.2, 468.6, 468.11, 532; 209/903, 910, 914, 916; 221/93, 94, 131, 224, 225; 901/6-8

[56] References Cited

U.S. PATENT DOCUMENTS

| 1,195,571 | 8/1916 | Flaherty | 414/222 |
| 2,395,511 | 2/1946 | Simpson | 198/468.6 X |
| 2,570,485 | 10/1951 | Rieber | 209/916 X |
| 3,314,554 | 4/1967 | Cuniberti | 198/468.2 X |
| 3,417,542 | 12/1968 | Merrill et al. | 221/93 X |
| 3,601,237 | 8/1971 | Ovsienko | 221/131 X |
| 4,228,901 | 10/1980 | Watzka et al. | 221/93 X |
| 4,299,532 | 11/1981 | Bouwmeester | 198/468.2 X |
| 4,566,837 | 1/1986 | Shiomi et al. | 414/222 |

FOREIGN PATENT DOCUMENTS 51-2152  1/1976  Japan.

Primary Examiner—Robert J. Spar
Assistant Examiner—Jay I. Alexander
Attorney, Agent, or Firm—Irving M. Weiner; Joseph P. Carrier; Pamela S. Burt

[57] ABSTRACT

An automatic parts feeder has a bed, a base movable on the bed in a first direction, a hopper assembly mounted on the base, a delivery mechanism, a transfer mechanism, and a supply mechanism for supplying parts to a processing machine. The supply mechanism supplies the parts in a second direction normal to the first direction, and includes a movable assembly movable in both the first and second directions, a swing arm pivotally supported on the movable assembly and angularly movable in a plane normal to the second direction between a substantially vertical upstanding position and an inclined position, and parts receivers detachably mounted on the swing arm for receiving, holding, and releasing the parts.

14 Claims, 22 Drawing Figures

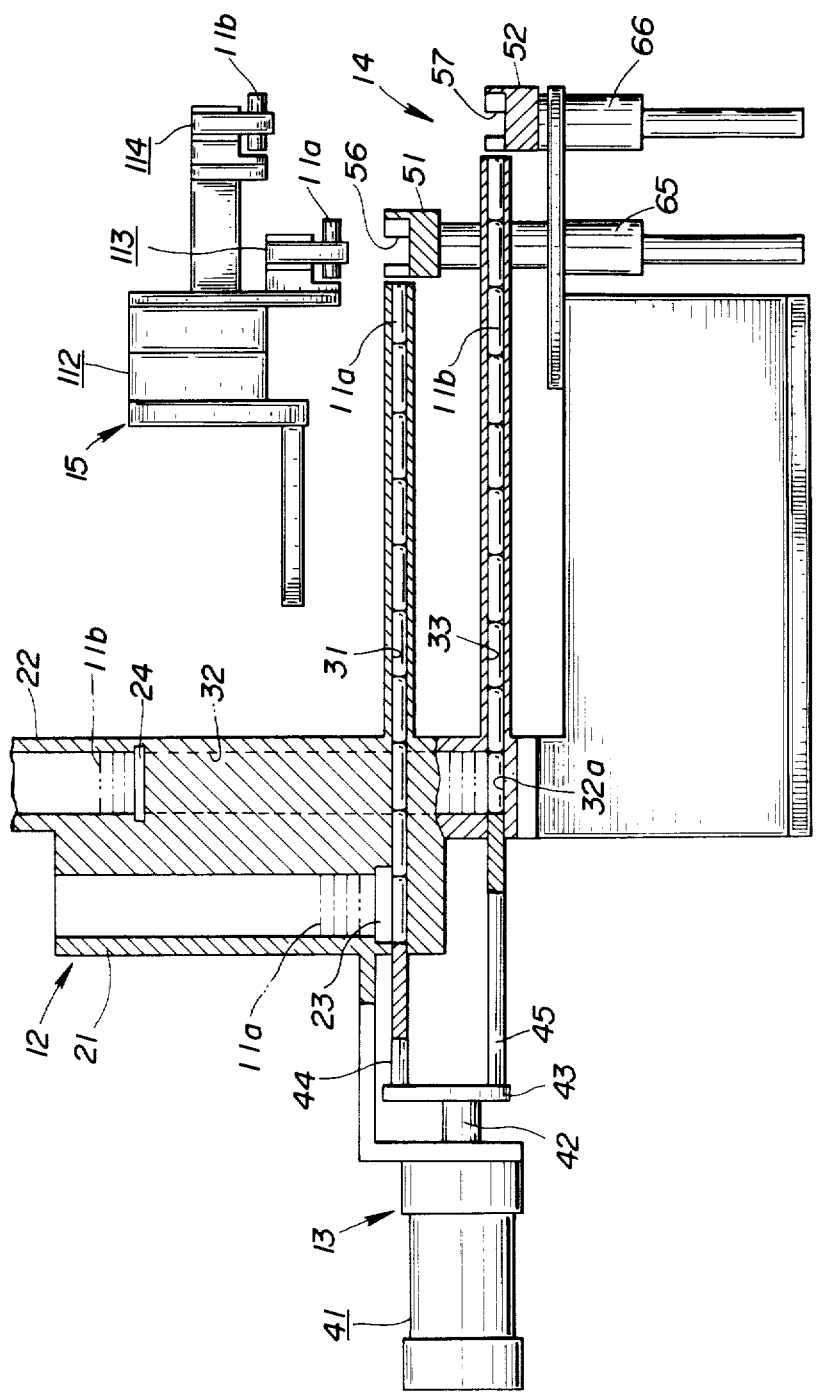

AUTOMATIC PARTS FEEDER

BACKGROUND OF THE INVENTION

1. Field of the Invention

The present invention relates to a parts feeder for automatically feeding parts such as valve guides for use in internal combustion engines, and more particularly to an automatic parts feeder suitable for use with an assembling device for pressing differently shaped valve guides into the cylinder heads of internal combustion engines of various designs.

2. Description of Relevant Art

There have been employed assembling devices for pressing sets of intake valve guides and exhaust valve guides alternately into the cylinder heads of internal combustion engines of different designs. Associated with such assembling devices, there has been a demand for a small-sized parts feeder capable of feeding various valve guides for use in such differently designed internal combustion engines. Most desirably, the parts feeder would be capable of operating automatically and efficiently.

A particular drawback associated with conventional parts feeders occurs where valve guides having flanges required by certain internal combustion engines are the parts to be fed. Such flanges have prevented the valve guides from being arranged neatly. Since the center of gravity of each flanged valve guide is longitudinally displaced from its geometrical center, its weight is not well balanced and the flanged valve guides cannot neatly be arranged in a vertical delivery chute in which they are vertically stacked. Therefore, the flanged valve guides cannot be smoothly and reliably fed out of the vertical delivery chute.

Another drawback associated with conventional parts feeders occurs in the production of internal combustion engines, where it has been customary to employ a parts feeder designed for feeding parts for one engine type on a mass-production basis. When internal combustion engines of another type are to be manufactured, the parts feeder must be replaced with a different parts feeder. The conventional parts feeder is therefore not suitable for the production of engines of many different types in relatively small quantities.

One known automatic parts feeder is disclosed in Japanese Patent Publication No. 51(1976)-2152. Since this prior automatic parts feeder is designed for automatically feeding balls for being pressed into engines, it cannot not be used for feeding specially shaped parts such as valve guides.

The present invention has been made in view of the drawbacks of the conventional parts feeders.

SUMMARY OF THE INVENTION

Accordingly, it is a primary object of the present invention to provide an automatic parts feeder capable of efficiently and automatically feeding parts of different shapes for installation in machines of different types.

Another object of the present invention is to provide an automatic parts feeder which is relatively small in size and constructed of a reduced number of components.

Still another object of the present invention is to provide an automatic parts feeder having a mechanism capable of smoothly and reliably transferring flanged parts from a parts delivery chute.

According to the present invention, there is provided an automatic parts feeder comprising a bed, track means mounted on the bed, a base movable on the track means in a first direction, a hopper assembly mounted on the base for containing parts, delivery means for successively delivering the parts from the hopper assembly, transfer means for transferring the parts from the delivery means, and supply means for supplying the parts from the transfer means to a processing device in a second direction substantially normal to the first direction, the supply means comprising a movable assembly movable in both the first and second directions, a swing arm pivotally supported on the movable assembly and angularly movable between a substantially vertical upstanding position and an inclined position, and parts receiver means detachably mounted on the swing arm for receiving, holding, and releasing the parts.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 4 is a side elevational view, partly in cross section, of the delivery mechanism;

DETAILED DESCRIPTION OF THE PREFERRED EMBODIMENT

The principles of the present invention will now be described as being incorporated in an automatic parts feeder apparatus for feeding valve guides for use in internal combustion engines.

Figure 1:
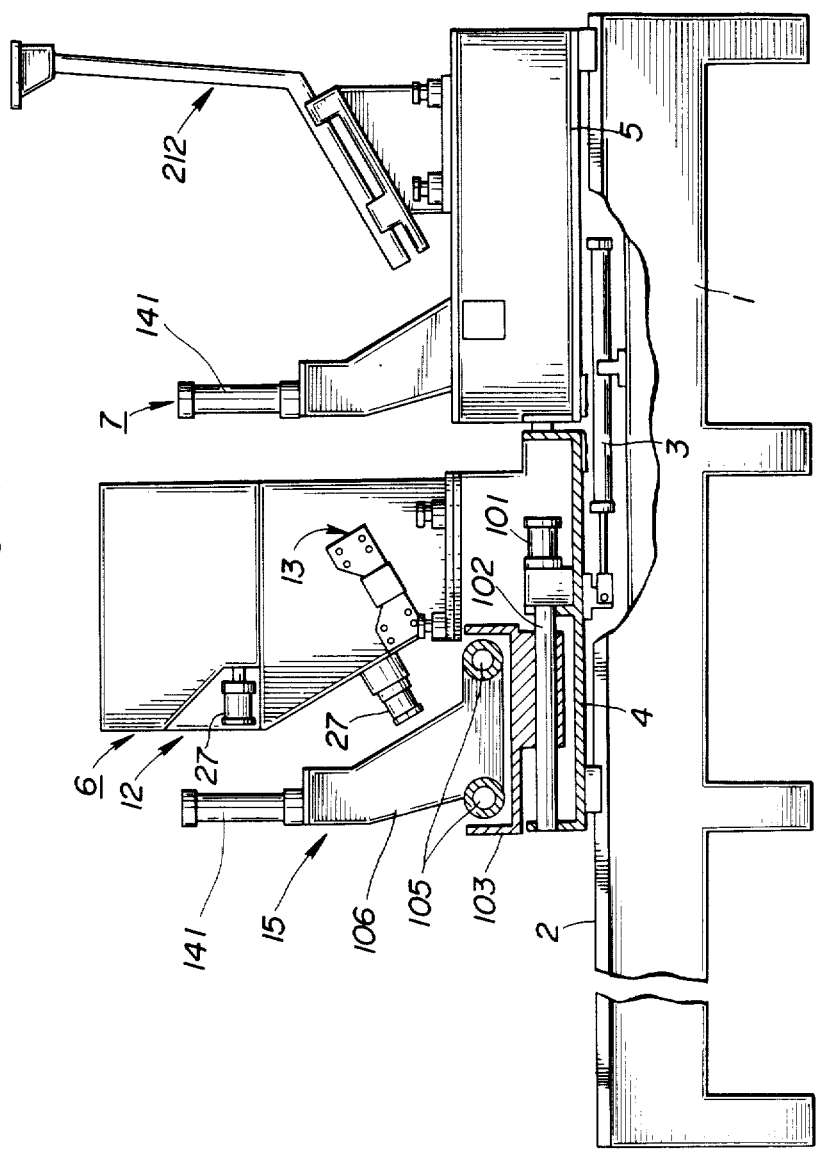
FIG. 1 is a front elevational view of an apparatus including two automatic parts feeders according to the present invention.

As shown in FIG. 1, rails 2 are mounted on a bed 1, and two interconnected bases 4, 5 are slidably mounted on the rails 2. The bases 4, 5 are slidable by means of a fluid cylinder 3 disposed on the bed 1. Automatic parts feeders 6, 7 are mounted respectively on the bases 4, 5.

The parts feeder 6 will first be described below. The parts feeder 6 can be positioned by actuating the fluid cylinder 3 to slide the base 4 on the rails 2.

The parts feeder 6 comprises a hopper assembly 12 for containing valve guides 11 (FIG. 2), a delivery mechanism 13 for successively delivering the valve guides 11 from the hopper assembly 12, a transfer mechanism 14 (FIG. 4) for transferring the valve guides 11 delivered by the delivery mechanism 13, and a supply mechanism 15 for supplying the valve guides 11 transferred from the transfer mechanism 14 to a desired supply position.

The parts feeder 6 will be described in greater detail with reference to FIGS. 2 through 4. The hopper assembly 12 includes a first hopper 21 for containing valve guides 11a for intake valves and a second hopper 22 for containing valve guides 11b for exhaust valves. The first and second hoppers 21, 22 are detachably mounted on the base 4 and have respective widths each slightly larger than the full length of each of the valve guides 11a, 11b.

Figure 3:
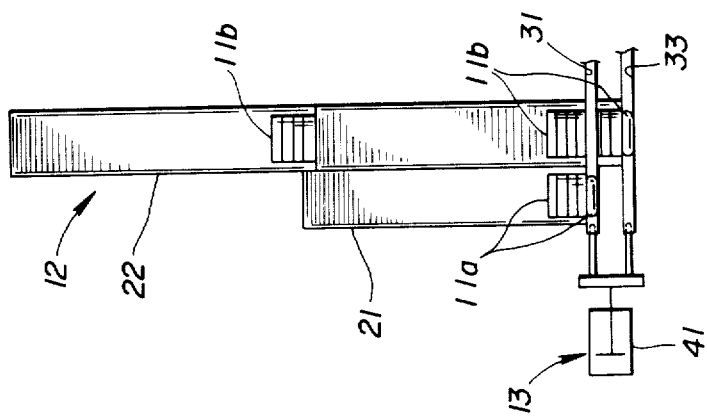
FIG. 3 is a side elevational view of the hopper assembly and the delivery mechanism of FIG. 2.

As illustrated in FIGS. 3 and 4, the first and second hoppers 21, 22 are juxtaposed in the longitudinal direction of the valve guides 11a, 11b contained therein. The second hopper 22 is positioned higher than the first hopper 21 as indicated by the dotted lines in FIG. 2.

The first and second hoppers 21, 22 have plate-like bottom plate members 23, 24, respectively, the bottom member 23 extending obliquely and the bottom member 24 extending substantially horizontally. The bottom members 23, 24 have guide grooves 25, 26, respectively, spaced at intervals for allowing the valve guides 11a, 11b to drop one by one therethrough. Each of the bottom members 23, 24 is reciprocally movable in a direction normal to the longitudinal direction of the valve guides 11a, 11b by a fluid cylinder 27 connected to an end of the bottom member.

Figure 2:
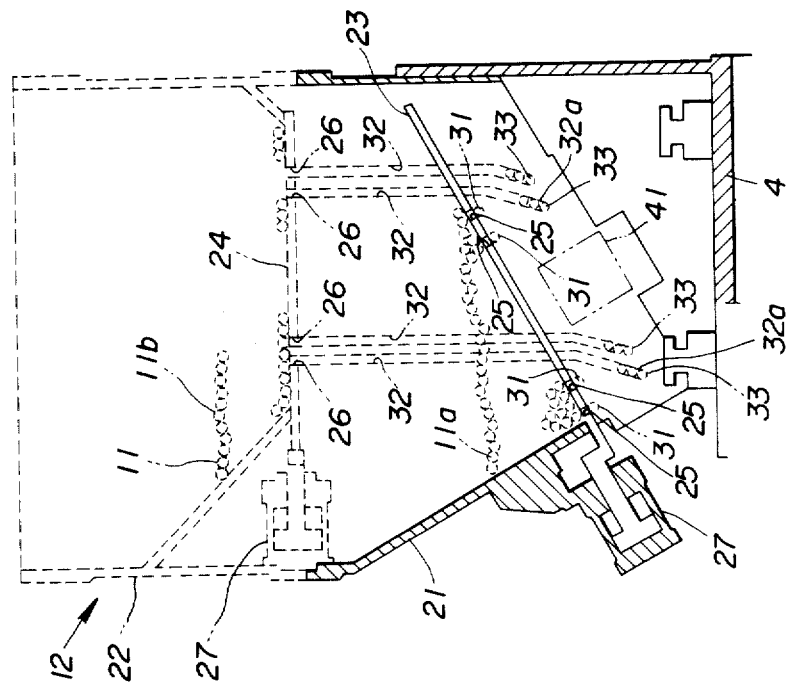
FIG. 2 is a cross-sectional view of a hopper assembly and a delivery mechanism in one of the parts feeders shown in FIG. 1.
Figure 5:
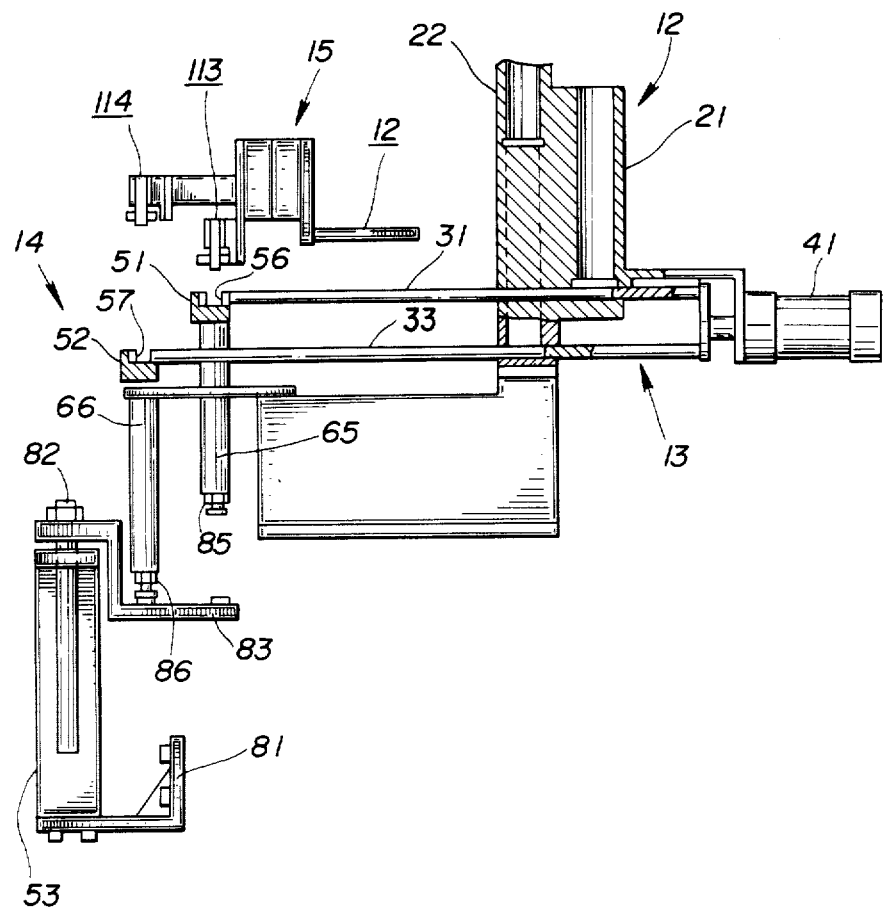
FIG. 5 is a fragmentary side elevational view, partly in cross section, of the parts feeder.

As shown in FIGS. 2 and 4, first delivery passages 31 are disposed below the respective guide grooves 25 and extend rearwardly of the second hopper 22, each of the first delivery passages 31 having an inside diameter corresponding to the diameter of the valve guides 11a.

Gravity-feed passages 32 are disposed below the respective guide grooves 26 for permitting valve guides 11b to fall therethrough, the gravity-feed passages 32 extending out of interference with the first delivery passages 31. The gravity-feed passages 32 have lower ends 32a positioned downwardly of the bottom member 23 and coupled to second delivery passages 33 extending rearwardly of the second hopper 22. The second delivery passages 33 have an inside diameter corresponding to the diameter of the valve guides 11b.

A pusher fluid cylinder 41 is located in front of the first hopper 21 and includes a piston rod 42 to which first and second rods 44, 45 are connected through a support plate 43. The first and second rods 44, 45 are positioned in alignment with the first and second delivery passages 31, 33. The first and second delivery passages 31, 33, the gravity feed passages 32, the pusher cylinder 41, and the first and second rods 44, 45 jointly constitute the delivery mechanism 13.

Operation of the delivery mechanism 13 is as follows: The intake valve guides 11a and the exhaust valve guides 11b are charged respectively into the first and second hoppers 21, 22. When the fluid cylinders 27 are actuated to move the bottom members 23, 24 back and forth, the valve guides 11a are smoothly supplied through the guide grooves 25 into ends of the first delivery passages 31, and the valve guides 11b are smoothly supplied through the guide grooves 26 and the gravity-feed passages 32 into the lower ends 32a thereof that are positioned at ends of the second delivery passages 33. Then, the pusher cylinder 41 is operated to cause the piston rod 42 and the support plate 43 to reciprocate the first and second rods 44, 45 to push the valve guides 11a, 11b into the first and second delivery passages 31, 33, respectively. As the pusher cylinder 41 is continuously actuated, the valve guides 11a, 11b are successively delivered simultaneously out of the opposite ends of the first and second delivery passages 31, 33. The first and second hoppers 21, 22, the gravity-feed passages 32, and the first and the first and second passages 31, 33 jointly serve as parts delivery lines.

Since the two hoppers 21, 22 are vertically displaced from each other and also displaced in the longitudinal direction of the valve guides the parts feeder 6 is relatively small in size despite the presence of the two hoppers 21, 22. The gravity-feed passages 32 extend downwardly from the upper hopper 22, and the second delivery passages 33 are positioned at the lower ends 32a of the gravity-feed passages 32. This arrangement allows the first and second delivery passages 31, 33 to be positioned easily at desired close locations within a limited space. Many valve guides 11a, 11b can therefore be delivered simultaneously by the single pusher cylinder 41. As a consequence, the number of components of the parts feeder 6 is reduced. As shown in FIGS. 2–4, the valve guides 11 are aligned parallel to each other in the hopper assembly 12, and are sequentially delivered to output positions of the hopper assembly which directly lead to the first and second delivery passages 31, 33.

The transfer mechanism 14 will hereinafter be described with reference to FIGS. 4 through 7. The transfer mechanism 14 includes a plurality of first and second receivers 51, 52 positioned at the ends of the first and second delivery passages 31, 33 for receiving the valve guides 11a, 11b delivered out of the passages 31, 33, and a fluid cylinder 53 (FIGS. 5 and 6) for moving the first and second receivers 51, 52.

Figure 7:
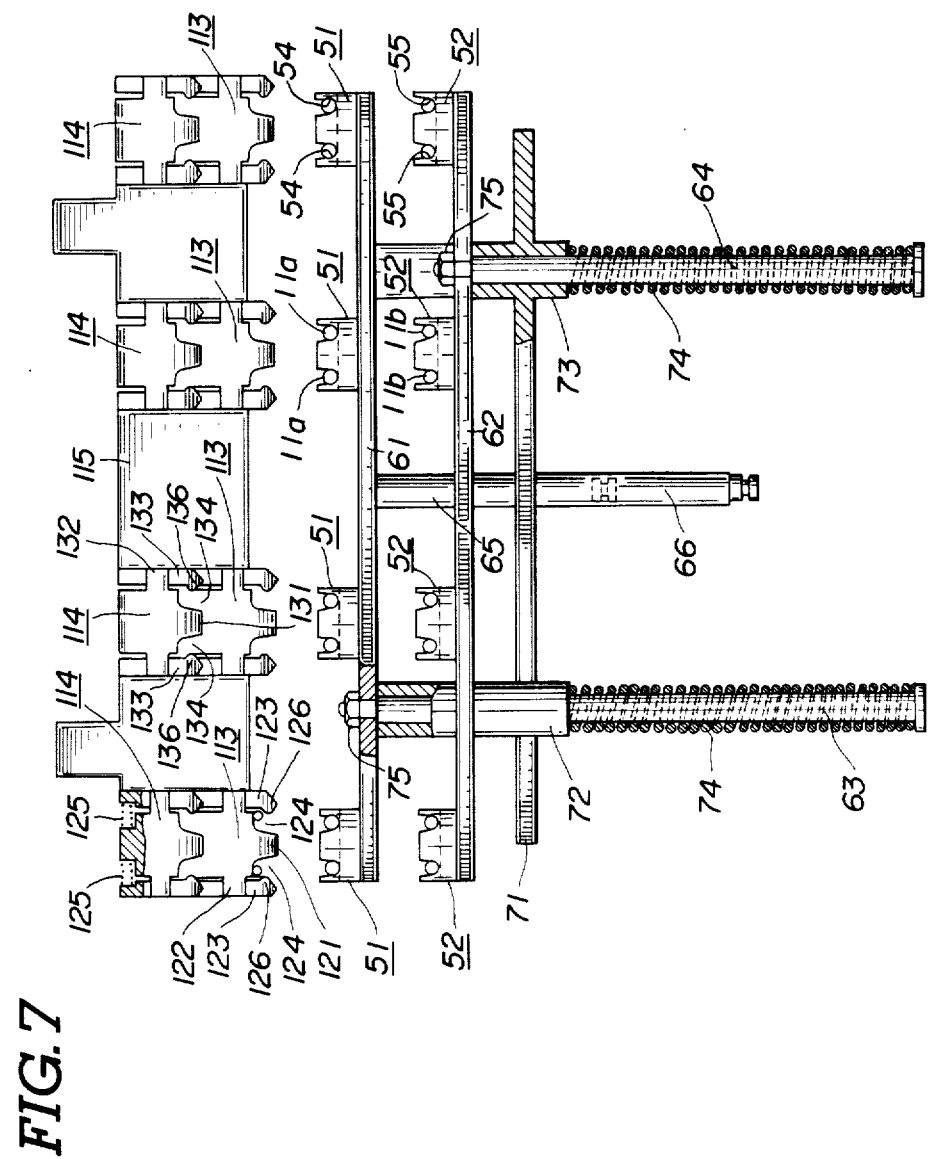
FIG. 7 is an enlarged elevational view, partly in cross section, of receivers.

As shown in FIG. 7, the first and second receivers 51, 52 have paired grooves 54, 55, respectively, aligned with the first and second delivery passages 31, 33 and opening in the direction in which the fluid cylinder 53 can be extended. The receivers 51, 52 have recesses 56, 57 (FIG. 4) defined across longitudinally intermediate portions of the grooves 54, 55.

The first and second receivers 51, 52 are attached respectively to plates 61, 62 coupled to guide rods 63, 64, respectively, and to pusher rods 65, 66, respectively, as shown in FIG. 7. A guide member 71 mounted on the base 4 has sleeves 72, 73 through which the guide rods 63, 64 are slidably inserted. The first and second receivers 51, 52 are normally urged toward the fluid cylinder 53 by compression coil springs 74 disposed around the guide rods 63, 64. The first and second receivers 51, 52 are detachably fastened to the guide rods 63, 64 by means of nuts 75 threaded over threaded ends of the guide rods 63, 64.

The fluid cylinder 53 is obliquely mounted on the base 4 by a bracket 81. The fluid cylinder 53 has a piston rod 82 attached to a support plate 83 to which guide rods 84 are fixed. Therefore, the support plate 83 is reciprocally movable by the piston rod 82 when the fluid cylinder 53 is actuated, the reciprocating movement of the support plate 83 being guided by the guide rods 84. When the fluid cylinder 53 is extended, the support plate 83 engages and pushes the pusher rods 65, 66 to move the first and second receives 51, 52 obliquely upwardly. When the fluid cylinder 53 is contracted, the first and second receivers 51, 52 are forced to return under the resilient forces of the compression coil springs 74. The pusher rods 65, 66 have length adjusting mechanisms 85, 86, respectively, for engagement with the support plate 83.

The supply mechanism 15 for supplying the valve guides 11a, 11b from the transfer mechanism 14 to a desired supply position will be described with reference to FIGS. 8 through 10.

Figure 8:
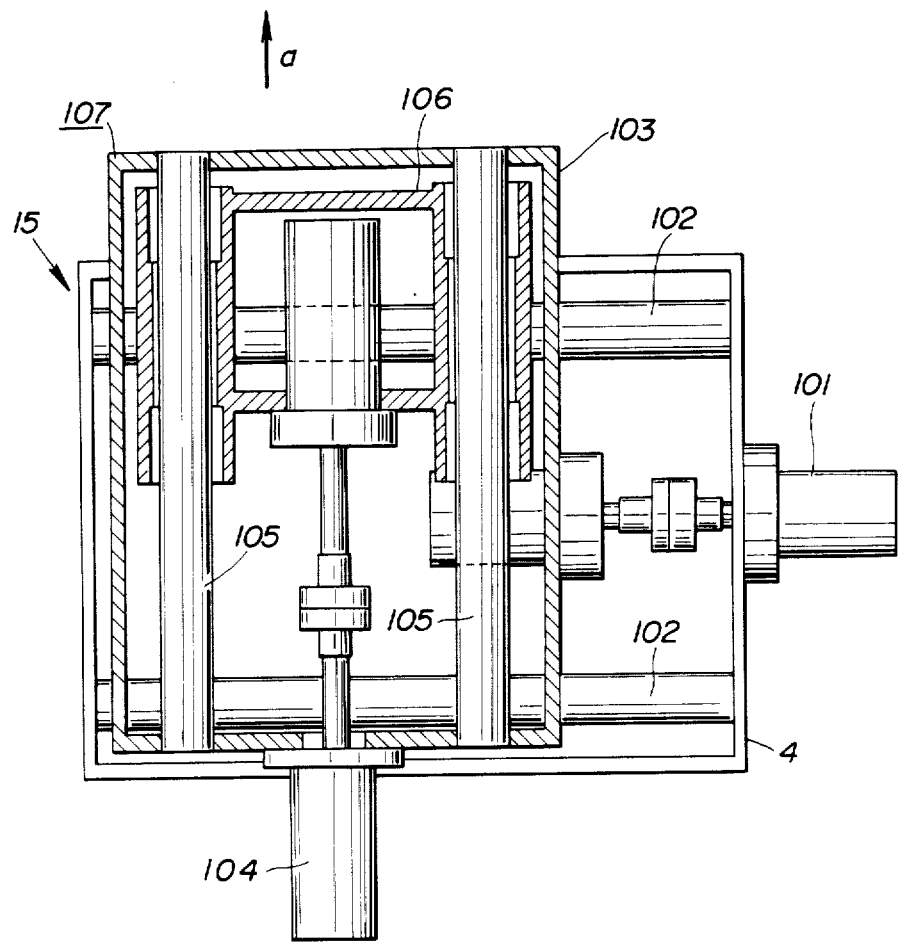
FIG. 8 is a plan view, partly in cross section, of a movable assembly of a supply mechanism of the parts feeder.

As shown in FIG. 8, the supply mechanism 15 comprises a base body 103 movable on the base 4 by a shifting fluid cylinder 101 and guided by guide rods 102 for movement normal to the direction of the arrow a toward the desired supply position, and another base body 106 mounted on the base body 103 and movable by a supply fluid cylinder 104, the base body 106 being guided by guide rods 105 for movement in the direction of the arrow a. The base bodies 103, 106 jointly constitute a movable assembly 107.

Figure 9:
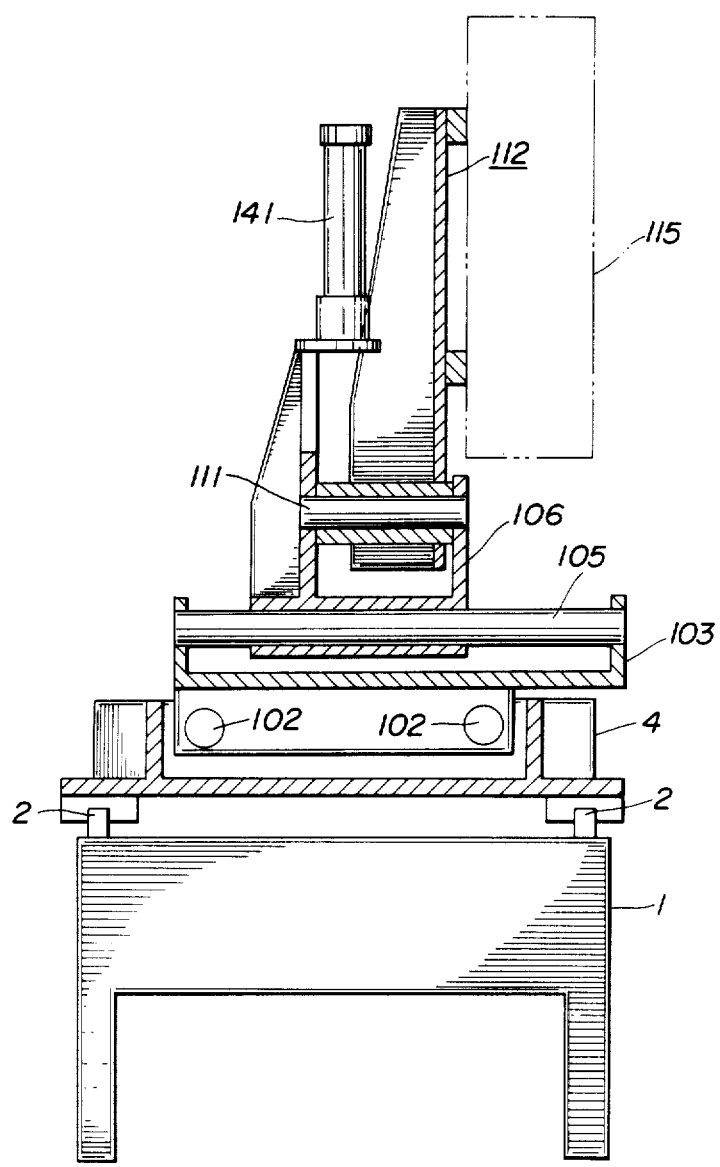
FIG. 9 is a side elevational view, partly in cross section, of the movable assembly.

As shown in FIG. 9, a swing arm 112 is vertically swingably mounted on the base body 106 by a pivot shaft 111. As shown in FIG. 7, a plurality of first and second receivers 113, 114 for coaction respectively with the first and second receivers 51, 52 are mounted on the swing arm 112 by a support plate 115, the first and second receivers 113, 114 being detachable from the swing arm 112.

Each of the first receivers 113 comprises a block 122 having a tongue 121 projecting toward the corresponding first receiver 51, and a pair of chuck jaws 123 swingably disposed one on each side of the block 122. The tongue 121 and the chuck jaws 123 define slots 124 for gripping the valve guides 11a and have such a thickness that the tongue 121 and the chuck jaws 123 can be inserted in the recess 56 of the corresponding first receiver 51. The chuck jaws 123 are normally biased by springs 125 to cause their distal ends to move toward the tongue 121, the chuck jaws 123 having engagement prongs 126 on their distal ends.

Each of the second receivers 114 is of a similar construction including a block 132 having a tongue 131, and a pair of chuck jaws 133 defining with the tongue 131 a pair of slots 134 for gripping the valve guides 11b and having engagement prongs 136, the chuck jaws 133 being normally urged by the springs 125 to move the engagement prongs 136 toward the tongue 131.

Figure 6:
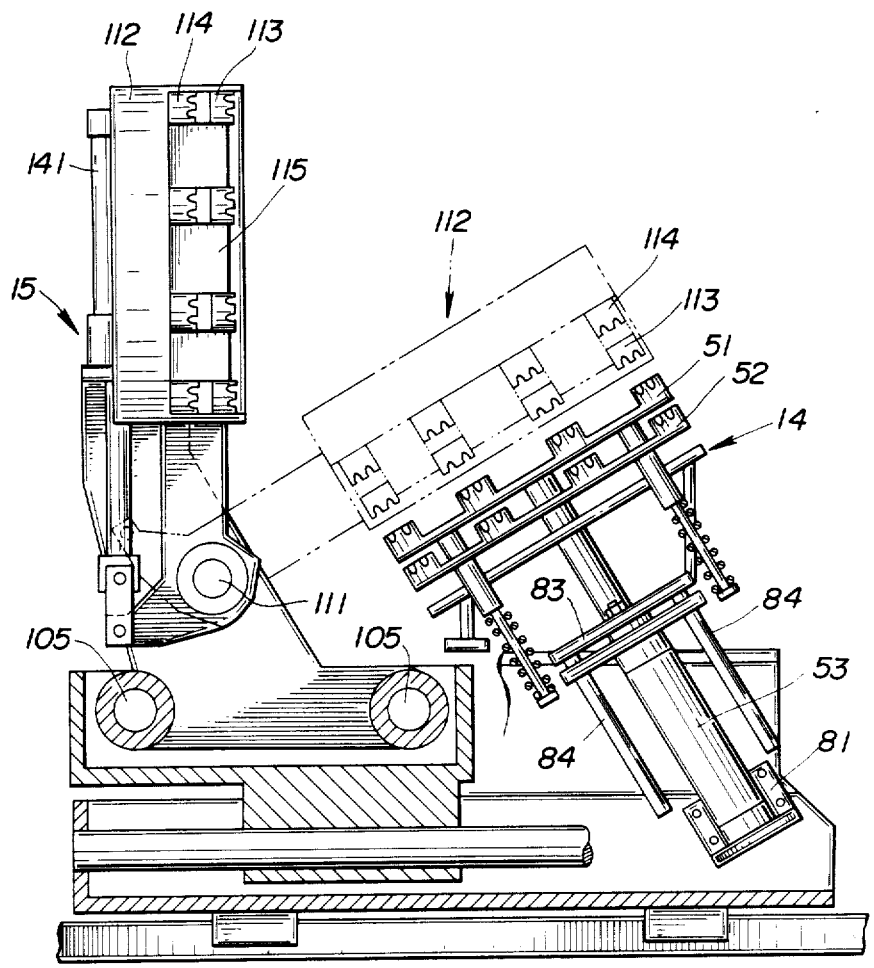
FIG. 6 is a rear elevational view of the parts feeder.

When a fluid cylinder 141 (FIG. 6) coupled to the swing arm 112 is contracted, the swing arm 112 is swung downwardly about the pivot shaft 111 as indicated by the imaginary lines to move the first and second receivers 113, 114 toward the respective first and second receivers 51, 52. Upon extension of the fluid cylinder 141, the swing arm 114 is angularly moved to an upstanding position as shown in FIGS. 6 and 9.

The supply mechanism 15 will operate as follows: The fluid cylinder 141 is actuated to lower the swing arm 112. Then, as shown in FIG. 4, the valve guides 11a, 11b are received from the ends of the first and second delivery passages 31, 33 by the first and second receivers 51, 52. The fluid cylinder 53 is extended to move the first and second receivers 51, 52 toward the first and second receivers 113, 114. As the first and second receivers 51, 52 are moved, the tongues 121 and the chuck jaws 123 are inserted into the recesses 56 of the first receivers 51 and the tongues 131 and the chuck jaws 133 are inserted into the recesses 57 of the second receivers 52. The intake valve guides 11a are gripped by the tongues 121 and the chuck jaws 123, and the exhaust valve guides 11b are gripped by the tongues 131 and the chuck jaws 133. A total of eight intake valve guides 11a and a total of eight exhaust valve guides 11b are now held by the first and second receivers 113, 114. After the valve guides 11a, 11b have been transferred to the first and second receivers 113, 114, the fluid cylinder 53 is contracted to bring the first and second receivers 51, 52 into alignment with the ends of the first and second delivery passages 31, 33, and the fluid cylinder 141 is extended to move the swing arm 112 to its upstanding position.

A sequence of operation of the supply mechanism 15 for supplying the valve guides 11a, 11b to the desired supply position will be described with reference to FIG. 10.

Two vertically spaced rows of eight presser rods 201 and eight presser rods 202 are mounted on a side of a rotor (not shown) in alignment with the first and second receivers 113, 114 for pressing the valve guides 11a, 11b into a cylinder head (not shown). The presser rods 201, 202 have smaller-diameter support pins 203, 204, respectively, on their distal ends for insertion into the respective valve guides 11a, 11b.

Figure 10A:
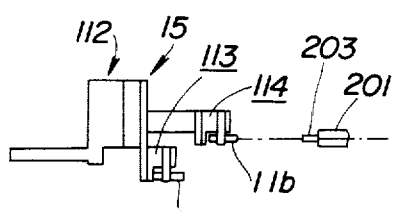
FIGS. 10(a) to 10(i) are a set of fragmentary views showing a sequence of operation of the supply mechanism.

The swing arm 112 is first held in the upstanding position. As shown in FIG. 10(a), the shifting cylinder 101 is operated to align the axes of the exhaust valve guides 11b with the axes of the pressure rods 201.

Figure 10E:
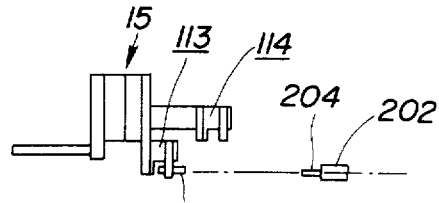
Figure 10B:
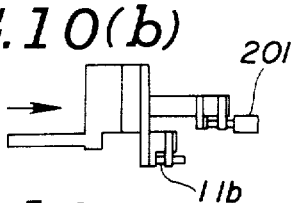

Then, the supply cylinder 104 is extended to insert the support pins 203 of the presser rods 201 into the respective valve guides 11b as shown in FIG. 10(b).

Figure 10F:
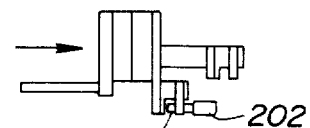
Figure 10C:
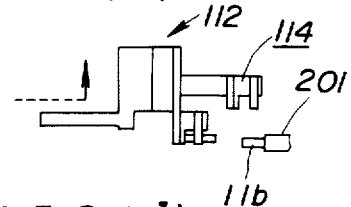
Figure 10G:
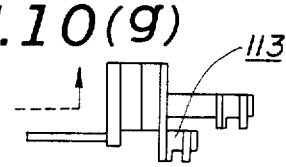
Figure 10D:
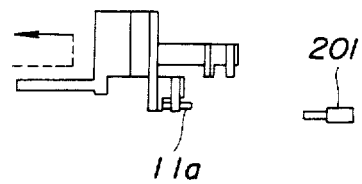

The shifting cylinder 101 is then extended to move the swing arm 112 and the second receivers 114 laterally away from the presser rods 201 in a direction normal to the longitudinal direction of the presser rods 201 as illustrated in FIG. 10(c). When the second receivers 114 are moved away from the presser rods 201, the chuck jaws 133 are displaced away from each other against the forces of the springs 125 to leave the valve guides 11b held on the support pins 203. The supply of the exhaust valve guides 11b is now completed. Thereafter, the supply cylinder 104 is contracted to retract the swing arm 112 away from the presser rods 201 as shown in FIG. 10(d).

For supplying the intake valve guides 11a, the non-illustrated rotor is rotated to position the presser rods 202 closely to the supply mechanism 15. The shifting cylinder 101 is operated to align the axes of the valve guides 11a with the axes of the presser rods 202, as shown in FIG. 10(e).

Figure 10H:
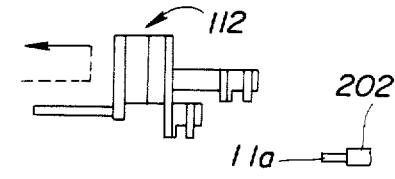
Figure 10I:
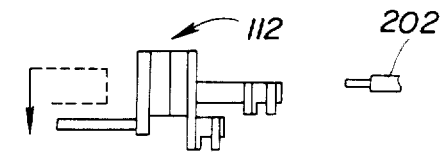

The valve guides 11a are then fed onto the presser rods 202 in the same manner as described above. More specifically, the supply cylinder 104 is extended to insert the support pins 204 of the presser rods 202 into the valve guides 11a as shown in FIG. 10(f). Then, the shifting cylinder 101 is extended to move the first receivers 113 laterally away from the presser rods 202 to leave the valve guides 11a on the support pins 204 as shown in FIG. 10(g). Thereafter, the supply cylinder 104 is contracted to retract the swing arm 112 as shown in FIG. 10(h), and then the shifting cylinder 101 is operated to move the swing arm 112 to the tilted position as shown in FIG. 10(i). One cycle of operation for supplying the valve guides 11b, 11b is now finished.

The strokes of movement of the movable assembly 107 in the direction toward the supply position and in the direction normal thereto can be selected as desired by the supply and shifting cylinders 104, 101, and the first and second receivers 113, 114 are detachable from the swing arm 112. Therefore, the supply mechanism 15 can be used for supplying valve guides to internal combustion engines of different designs. The parts feeder 6 can advantageously be incorporated in a production line for manufacturing differently designed internal combustion engines in small quantities.

The first and second receivers 113, 114 for supplying the intake and exhaust valve guides 11a, 11b are moved by the common shifting and supply cylinders 101, 104. Therefore, the parts feeder 6 is desirably rendered small in size and can efficiently operate in a shortened period of time because the movements thereof are reduced in size compared to conventional parts feeders.

The other parts feeder 7 will now be described with reference to FIGS. 11 through 14. The parts feeder 7 serves to feed valve guide 11 having flanges 11c. The parts feeder 7 can be positioned by actuating the fluid cylinder 3 to slide the base 5 on the rails 2.

Figure 11:
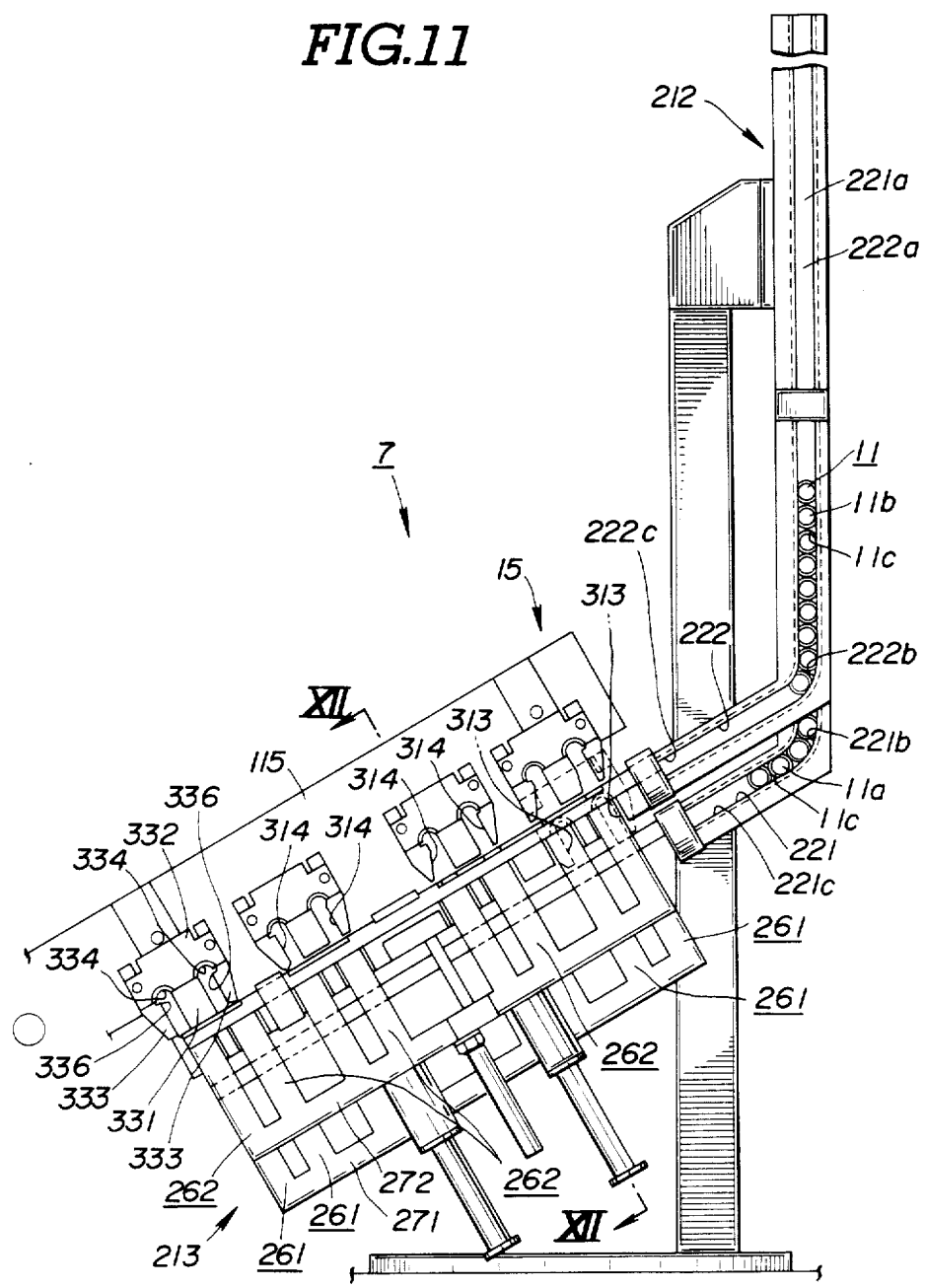
FIG. 11 is a front elevational view of the other parts feeder, showing a delivery chute and a transfer mechanism.

As illustrated in FIG. 11, the parts feeder 7 comprises a delivery chute 212 for the valve guides 11, a transfer mechanism 213 for transferring the valve guides 11 from delivery chute 212, and a supply mechanism 15 of the same construction as that of the supply mechanism 30 of the parts feeder 6 for supplying the valve guides 11 transferred from the transfer mechanism 213.

Those components of the parts feeder 7 which are identical to the components of the parts feeder 6 are denoted by identical reference characters.

Figure 12:
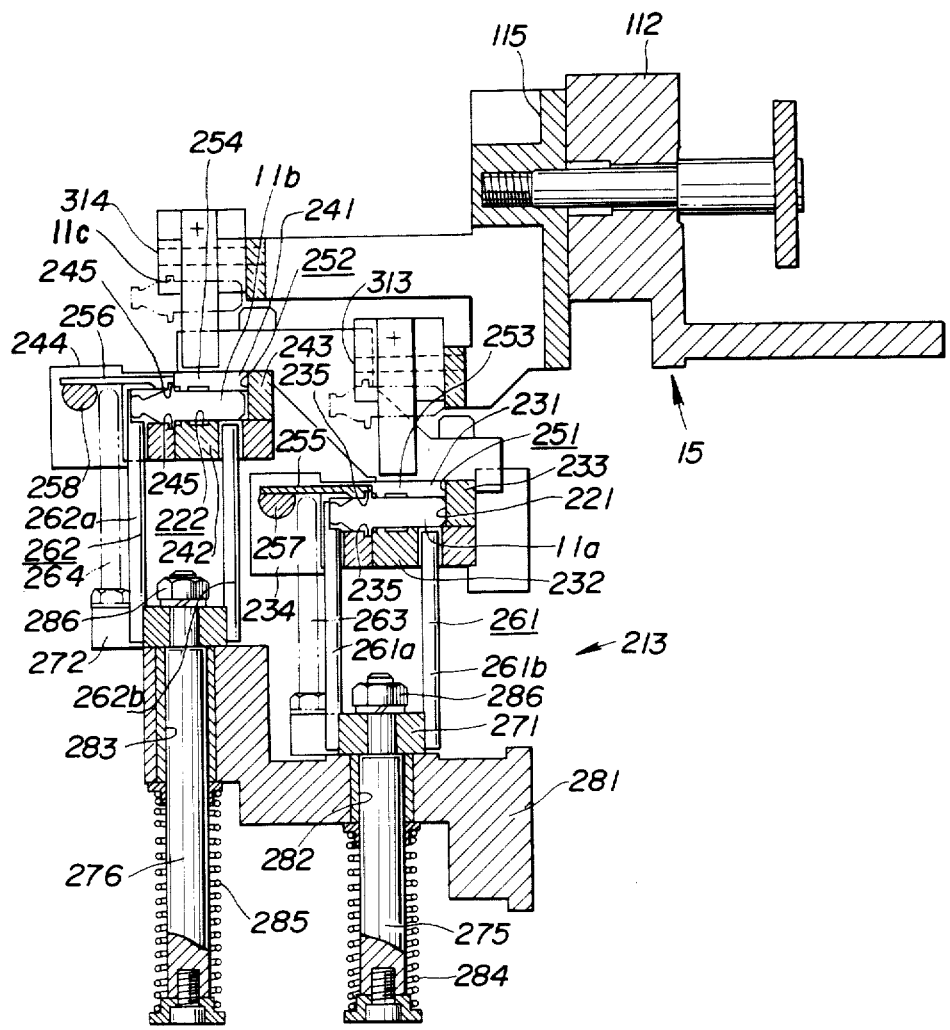
FIG. 12 is an enlarged cross-sectional view taken along line XII—XII of FIG. 11.

The delivery chute 212 comprises a first passage 221 for guiding the intake valve guides 11a and a second passage 222 for guiding the exhaust valve guides 11b. The first and second passages 221, 222 are detachably mounted on the base 5. As shown in FIG. 12, the first passage 221 is constructed of members 231, 232 for guiding the shanks of the valve guides 11a, and members 233, 234 for guiding the ends of the valve guides 11a. The members 231, 232 have guide grooves 235 defined in their confronting surfaces for guiding the flanges 11c of the valve guides 11a. Likewise, the second passage 222 is constructed of members 241, 242 for guiding the shanks of the valve guides 11b, and members 243, 244 for guiding the ends of the valve guides 11b. The members 241, have guide grooves 245 defined in their confronting surfaces for guiding the flanges 11c of the valve guides 11b. The valve guides 11a, 11b as they fall in the passages 221, 222 have their longitudinal axes held substantially horizontally and are arranged in rows in directions normal to their longitudinal axes.

As shown in FIG. 11, the passages 221, 222 comprise substantially vertical portions 221a, 222a, and inclined portions 221c, 222c connected to the lower ends of the vertical portions 221a, 222a through curved portions 221b, 222b, respectively, and extending obliquely with respect to the vertical direction.

The inclined portions 221c, 222c have a plurality of first and second outlets 251, 252 (FIG. 12) spaced at intervals in the direction in which the inclined portions 221c, 222c extend. The first and second outlets 251, 252 are defined by openings 253, 254, respectively, for disharging the respective valve guides 11a, 11b, one at a time, out of the passages 221, 222, and lids 225, 256 disposed on one side of the openings 253, 254 for guiding the flanges 11c and the valve guide shanks close thereto.

The lids 225, 256 are angularly openable about pivot shafts 257, 258 away from the passages 221, 222. The lids 255, 256 are normally urged as by torsion springs (not shown) to move into their closed position, the lids 255, 256 serving part of the passages 221, 222, as shown in FIG. 12.

The transfer mechanism 213 for transferring the valve guides 11a, 11b out of the passages 221, 222 is positioned below the first and second outlets 251, 252 of the inclined passage portions 221c, 222c. The transfer mechanism 213 comprises first and second transfer rods 261, 262 located at the outlets 251, 252 and extending in a direction substantially normal to the direction in which the inclinded portions 221c, 222c extend. The transfer mechanism 213 also comprises a plurality of rods 263, 264 for opening the lids 255, 256, and a pusher fluid cylinder 53 for moving the first and second transfer rods 261, 262.

The transfer rods 261 are grouped into rods 261a of a rectangular cross section for engaging longitudinal ends and front shank portions of the valve guides 11a through the member 232, and rods 261b of a rectangular cross section for engaging rear shank portions of the valve guides 11a through the member 232, so that the valve guides 11a with their center of gravity displaced longitudinally can be stably supported. Similarly, the second transfer rods 262 are grouped into two arrays of rods 262a, 262b identical to the rods 261a, 261b.

Figure 14:
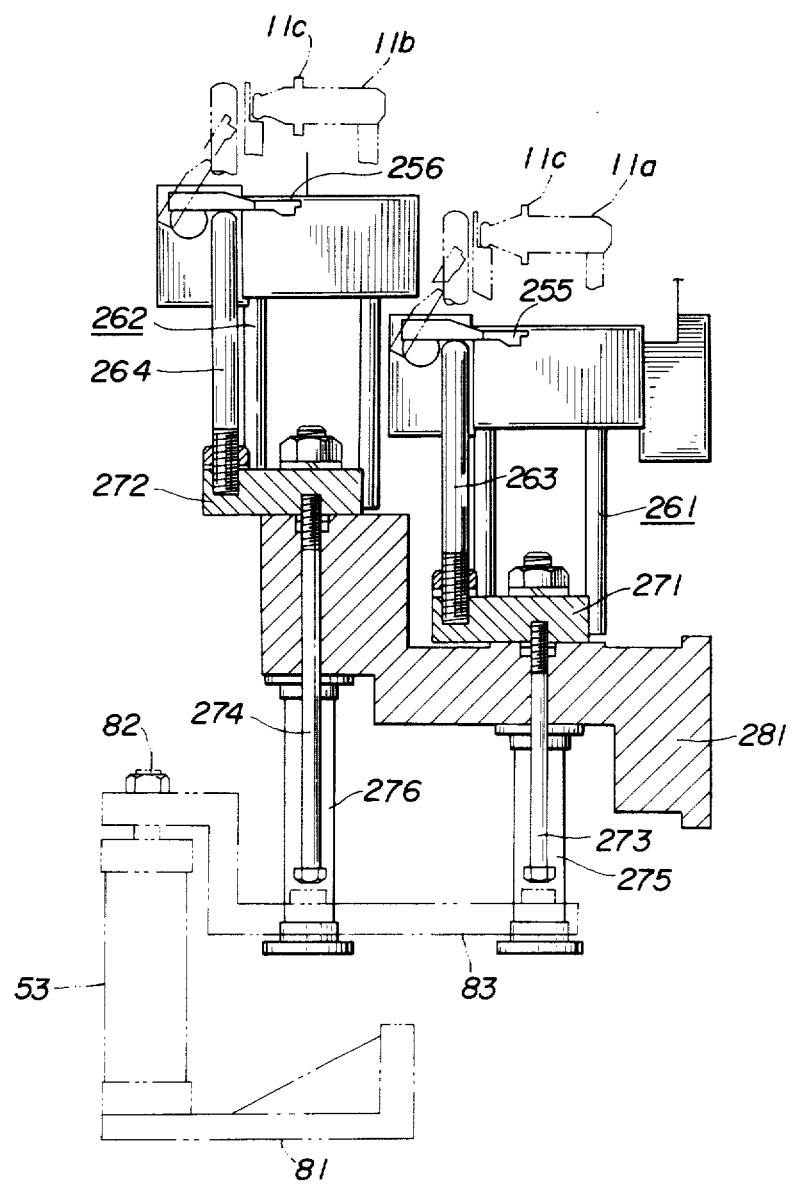
FIG. 14 is a side elevational view, partly in cross section, of the transfer mechanism, showing the manner in which it operates.

The first transfer rods 261 and the lid opening rods 263, and the second transfer rods 262 and the lid opening rods 264 are attached to plate members 271, 272, respectively, connected to respective pusher rods 273, 274 and respective guide rods 275, 256, as shown in FIG. 14. As illustrated in FIG. 12, the guide rods 275, 276 are inserted through respective guide holes 282, 283 defined in a guide block 281 mounted on the base 5, and compression coil springs 284, 285 are disposed around the guide rods 275, 276 for normally urging the rods 261, 263 and also the rods 262, 264, respectively, toward the pusher cylinder 53. The support plates 271, 272 and the guide rods 275 are detachably fastened to each other by nuts 286.

The pusher cylinder 53 is mounted on the base 5 by a bracket 81 and has a piston rod 82 to which a support plate 83 is secured. When the pusher cylinder 53 is extended, the support plate 83 is brought into engagement with the pusher rods 273, 274 to raise the rods 261, 263 and also the rods 262, 264. The rods 261, 263 and also the rods 262, 264 can be returned under the resilient forces of the compression coil springs 284, 285 upon contraction of the pusher cylinder 53.

The delivery chute 212 and the transfer mechanism 213 will operate as follows: The intake valve guides 11a are charged from the upper end of the first passage 221, and the exhaust valve guides 11b are changed from the upper end of the second passage 222. The valve guides 11a, 11b are then fed by gravity down the vertical portions 221a, 222a into the inclined portions 221c, 222c.

Then, the pusher cylinder 53 is operated to cause the support plate 83 and the pusher rods 273, 274 to raise the first transfer rods 261 and the lid opening rods 263 and also the second transfer rods 262 and the lid opening rods 264. The lids 255, 256 are then opened by the rods 263, 264, and the valve guides 11a, 11b are pushed by the first and second transfer rods 261, 262 out of the first and second outlets 251, 252, respectively, obliquely upwardly of the passages 221, 222.

Since the inclined portions 221c, 222c extend obliquely to the vertical direction, the valve guide 11a, 11b with the flanges 11c can neatly be arranged in the inclined portions 221c, 222c with the longitudinal axes of the valve guides 11a, 11b being kept substantially horizontally by the included portions 221c, 222c, and also the valve guides 11a, 11b can be smoothly and reliably delivered out of the passages 221, 222 by the first and second transfer rods 261, 262.

The valve guides 11a, 11b transferred from the transfer mechanism 213 are then delivered to the supply mechanism 15, by which the valve guides 11a, 11b can be fed to the desired supply position in the manner described above.

The supply mechanism 15 of the parts feeder 7 differs from the supply mechanism 15 of the parts feeder 6 as follows: As shown in FIGS. 11 and 12, the supply mechanism 15 has a swing arm 112 to which a plurality of first and second receivers 313, 314 for coaction with the first and second outlets 251, 252, respectively, are attached through a support plate 115. The first and second receivers 313, 314 are detachable from the swing arm 112.

Figure 13:
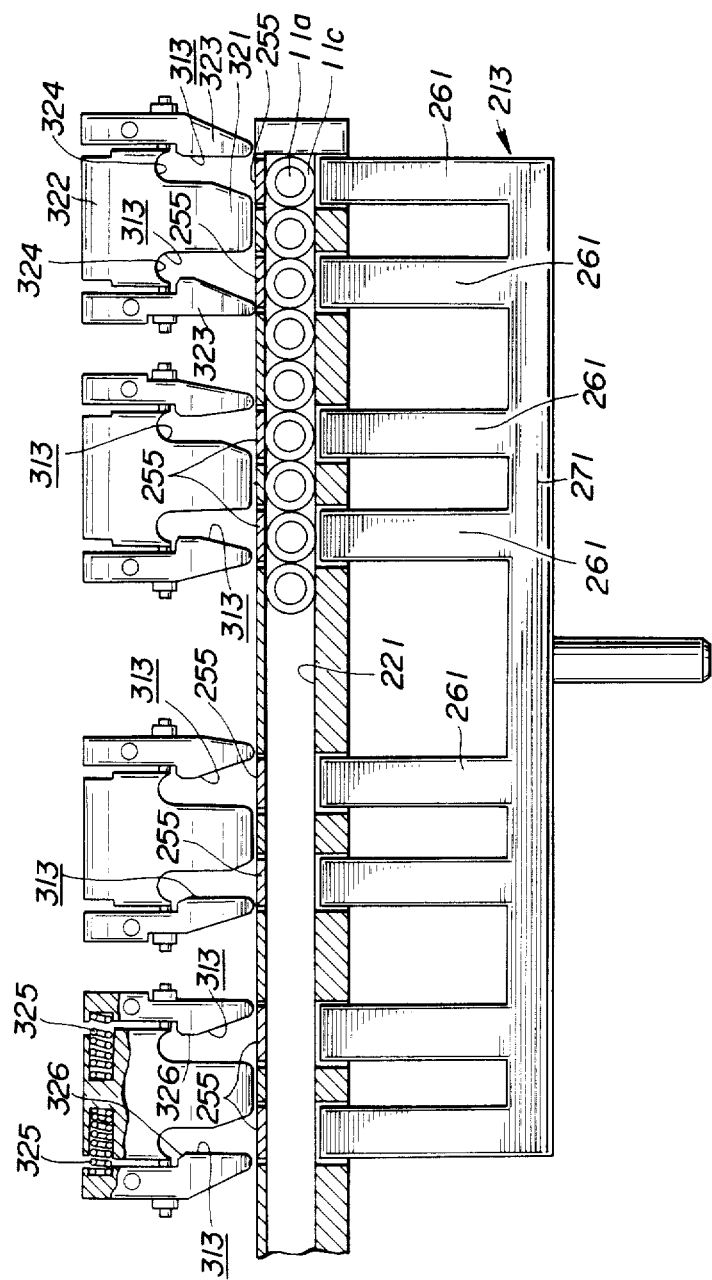
FIG. 13 is an enlarged front elevational view, partly in cross section, of the transfer mechanism as connected to a supply mechanism.

As shown in FIG. 13, each of the first receivers 313 comprises a block 322 having a tongue 321 projecting toward the corresponding first outlet 251, and a pair of chuck jaws 323 pivotally movably disposed one on each side of the tongue 321. The tongue 321 and the chuck jaws 323 jointly define grooves 324 for gripping the valve guides 11a. The chuck jaws 323 are normally urged by springs 325 to turn their distal ends toward the tongue 321, and have engagement prongs 326 remotely placed from the distal ends thereof.

Each of the second receivers 314 similarly comprises, as shown in FIG. 11, a block 332 having a tongue 331, and a pair of chuck jaws 333 defining with the tongue 331 a pair of grooves 334 for gripping the valve guides 11b and having engagement prongs 336. The chuck jaws 33 are normally urged by springs to turn their distal ends toward the tongue 331.

When a cylinder 141 (FIG. 1) of the parts feeder 7 is contracted, the swing arm 112 is swung downwardly about its pivot shaft to bring the first and second receivers 313, 314 into alignment with the first and second outlets 251, 252, respectively. Upon extension of the cylinder 141, the swing arm 112 is swung back to its upstanding position.

Operation of the supply mechanism 15 of the parts feeder 7 will be described below.

The swing arm 112 is first turned downwardly by the cylinder 141.

Then, the intake and exhaust valve guides 11a, 11b are moved by the first and second transfer rods 261, 262 toward the first and second receivers 313, 314. As the first and second transfer rods 261, 262 are moved, the valve guides 11a are guided and held by the tongues 321 and the chuck jaws 323, and the valve guides 11b are guided and held by the tongues 331 and the chuck jaws 333. In the illustrated embodiment, a total of eight intake valve guides 11a and a total of eight exhaust valve guides 11b are held by the first and second receivers 313, 314. Thereafter, the cylinder 53 is contracted, and the swing arm 112 is brought back to the upstanding position by extending the cylinder 141.

Then, the intake and exhaust valve gudies 11a, 11b are transferred from the supply mechanism 15 to the presser rods 201, 202 (FIG. 8).

With the arrangement of the present invention, the bases 4, 5 are mounted on the bed 1 for movement in the direction normal to the direction toward the parts supply position, and the supply mechanisms 15 with variable strokes of movement are mounted respectively on the bases 4, 5. In addition, the delivery mechanism or chute and the transfer mechanism are detachably mounted on the bases 4, 5. As a consequence, the parts feeders 6, 7 are easily adaptable to various valve guides of different designs. By installing various delivery mechanisms or chutes and various transfer mechanisms on the bases, the parts feeders can automatically and efficiently feed different valve guides for assemblage into internal combustion engines desired to be produced.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. An automatic parts feeder comprising:
   a bed;
   a base means movable on said bed in a first direction;
   a hopper assembly mounted on said base means for containing parts;
   delivery means for successively delivering the parts from said hopper assembly to a transfer means;
   said transfer means transferring the parts received from said delivery means to a supply means;
   said supply means supplying the parts received from said transfer means to a processing device in a second direction substantially normal to said first direction; and
   said supply means comprising a movable assembly movable relative to said base means in both said first and second directions, a swing arm pivotally supported on said movable assembly and angularly movable between a substantially vertical upstanding position and an inclined position, and parts receiver means detachably mounted on said swing arm for receiving, holding, and releasing the parts.

2. An automatic parts feeder according to claim 1, wherein said parts receiver means comprises means for receiving and holding the parts when said swing arm is in said inclined position and releasing the parts to supply them to said processing device when said swing arm is in said upstanding position.

3. An automatic parts feeder according to claim 1, wherein said swing arm is swingable in a plane lying substantially normal to said second direction.

4. An automatic parts feeder according to claim 1, wherein said transfer means includes means for receiving the parts from said delivery means and transferring the parts to said supply means.

5. An automatic parts feeder according to claim 1, including a plurality of bases movable on said base means, and said hopper assembly, said delivery means, said transfer means, and said supply means being disposed on each of said bases.

6. An automatic parts feeder according to claim 5, wherein said bases are interconnected.

7. An automatic parts feeder according to claim 1, wherein said hopper assembly comprises a plurality of hoppers and said delivery means comprises a plurality of delivery passages and a single pusher means for simultaneously pushing the parts out of said delivery passages.

8. An automatic parts feeder according to claim 1, wherein said hopper assembly comprises two hoppers having respective widths larger than the length of the parts and respective higher and lower heights, said two hoppers being juxtaposed in the longitudinal direction of the parts, each of said hoppers having a bottom member having guide grooves for allowing the parts to drop therethrough from the hopper, said delivery means comprising a first delivery passage extending below said guide grooves of said bottom member of the hopper having the lower height in the longitudinal direction of the parts, a gravity-feed passage extending below said guide grooves of the hopper having the higher height downwardly in the radial direction of the parts, said gravity-feed passage having a lower end positioned downwardly of said bottom member of the hopper having the lower height, and a second delivery passage extending from said lower end of the gravity-feed passage in the longitudinal direction of the parts.

9. An automatic parts feeder according to claim 1, wherein said delivery means comprises a passage extending radially of the parts and obliquely downwardly at an angle with respect to the vertical direction for guiding the parts with the longitudinal axes thereof kept substantially horizontally, outlets defined in said passage and opening in the longitudinal direction of the parts, and means disposed in the vicinity of said passage for transferring the parts out of said passage through said outlets, each of the parts having a radially extending flange.

10. An automatic parts feeder according to claim 1, wherein said parts as contained in said hopper assembly are aligned.

11. An automatic parts feeder according to claim 10, wherein said hopper assembly includes means for sequentially delivering said aligned parts to output positions thereof.

12. An automatic parts feeder according to claim 1, wherein said transfer means includes a plurality of receivers for receiving said parts from said delivery means, and pushing means for moving said receivers towards said parts receiver means of said supply means; and said pushing means being obliguely mounted on said base.

13. An automatic parts feeder for feeding cylindrical parts comprising:
a bed;
a base movable on said bed in a first direction;
a hopper assembly mounted on said base for containing parts;
delivery means for successively delivering the parts from said hopper assembly to a transfer means;
said transfer means transferring the parts received from said delivery means to a supply means; and
said supply means supplying the parts received from said transfer means to a processing device in a second direction substantially normal to said first direction;
said delivery means comprises a passage extending radially of the parts and obliquely downwardly at an angle with resepct to the vertical direction for guiding the parts with the longitudinal axes thereof kept substantially horizontally, outlets defined in said passage and opening in the longitudinal direction of the parts, and means disposed in the vicinity of said passage for transferring the parts out of said passage through said outlets, each of the parts having a radially extending flange.

14. An automatic parts feeder for feeding cylindrical part comprising:
a bed;
a base means movable on said bed in a first direction;
a hopper assembly mounted on said base for containing parts;
delivery means for successively delivering the parts from said hopper assembly to a transfer means;
said transfer means transferring the parts received from said delivery means to a supply means; and
said supply means supplying the parts received from said transfer means to a processing device in a second direction substantially normal to said first direction;
said hopper assembly comprises two hoppers having respective widths larger than the length of the parts and respective higher and lower heights, said two hoppers being juxtaposed in the longitudinal direction of the parts, each of said hoppers having a bottom member having guide grooves for allowing the parts to drop therethrough from the hopper, said delivery means comprising a first delivery passage extending below said guide grooves of said bottom member of the hopper having the lower height in the longitudinal direction of the parts, a gravity-feed passage extending below said guide grooves of the hopper having the higher height downwardly in the radial direction of the parts, said gravity-feed passage having a lower end positioned downwardly of said bottom member of the hopper having the lower height, and a second delivery passage extending from said lower end of the gravity-feed passage in the longitudinal direction of the parts.

* * * * *

UNITED STATES PATENT AND TRADEMARK OFFICE
CERTIFICATE OF CORRECTION

PATENT NO. : 4,714,397

DATED : December 22, 1987

INVENTOR(S) : Ohkuma et al.

It is certified that error appears in the above-identified patent and that said Letters Patent is hereby corrected as shown below:

```
Column  4, line 16, delete "and the first" (first occurrence);
           line 20, after "guides" insert a comma.
Column  5, line  5, change "receives" to --receivers--.
Column  7, line 23, change "guide" to --guides--;
           line 50, after "241," insert --242--;
           line 68, change "225" to --255--.
Column  8, line  4, change "225" to --255--;
           line 17, change "inclinded" to --inclined--;
           line 36, change "256" to --276--;
           line 58, change "changed" to --charged--.
Column  9, line  8, change "included" to --inclined--.
Column 10, line  1, change "gudies" to --guides--.
Column 12, line 23 (claim 14, line 2), change "part"
to --parts--.
```

Signed and Sealed this

Fourteenth Day of June, 1988

Attest:

DONALD J. QUIGG

Attesting Officer

Commissioner of Patents and Trademarks